United States Patent [19]

Tsukuda et al.

[11] Patent Number: 4,808,490

[45] Date of Patent: Feb. 28, 1989

[54] PLASMA SPRAYED FILM RESISTOR HEATER

[75] Inventors: Yasuo Tsukuda, Tokyo; Hisao Hara, Saitama, both of Japan

[73] Assignee: Hitachi Metals, Ltd., Tokyo, Japan

[21] Appl. No.: 924,260

[22] Filed: Oct. 29, 1986

Related U.S. Application Data

[63] Continuation of Ser. No. 686,850, Dec. 26, 1984, abandoned.

[30] Foreign Application Priority Data

Dec. 28, 1983 [JP] Japan ............................ 58-248718

[51] Int. Cl.4 ........................ B05D 3/06; B32B 9/00; B32B 15/00

[52] U.S. Cl. .............................. 428/699; 428/697; 428/433; 428/446; 427/34

[58] Field of Search ................ 427/34, 423; 428/697, 428/699, 433, 446

[56] References Cited

U.S. PATENT DOCUMENTS 3,309,643 3/1967 Ferretti ............................ 428/547
3,425,864 2/1969 Morey ............................ 427/34
3,679,473 7/1972 Blatchford ............................ 117/212
3,927,223 12/1975 Takabatake et al. ............................ 427/34
4,055,705 10/1977 Stecura et al. ............................ 427/34

FOREIGN PATENT DOCUMENTS 1377471 9/1963 France .
1057982 2/1967 United Kingdom .
2147777 9/1983 United Kingdom .

*Primary Examiner*—Norman Morgenstern
*Assistant Examiner*—Marianne L. Padgett
*Attorney, Agent, or Firm*—Birch, Stewart, Kolasch & Birch

[57] ABSTRACT

A film resistor heater comprising a sprayed film resistor comprisng NiCr particles uniformly dispersed and partly contacted with each other in an insulating ceramic matrix. The film resistor heater may further comprise a bonding layer, an insulating layer and a protective layer. The film resistor heater is prepared by spraying, particularly plasma spraying. It may be used advantageously for home electric appliances such as hot plates, rice cookers and vacuum kettles, heat rolls for electrostatic copiers, etc.

2 Claims, 1 Drawing Sheet

PLASMA SPRAYED FILM RESISTOR HEATER

This application is a continuation of copending application Ser. No. 686,850 filed on Dec. 26, 1984 now abandoned.

BACKGROUND OF THE INVENTION

1. Field of the Invention

The present invention relates to a film resistor heater comprising a sprayed film resistor comprising NiCr particles uniformly dispersed in an insulating matrix.

2. Description of the Prior Art

Sheathed heaters have conventionally been used for the purpose of heating various objects. A typical sheathed heater comprises an aluminum sheath, an MgO insulating powder contained in the sheath and an NiCr wire embedded in the insulating powder. When a plate or a vessel is to be heated, the sheathed heater is attached to the wall of the plate or the vessel by caulking, etc. Since the sheathed heater is round in cross-section, its contact area with the wall is very small. Thus, heat directly conducted from the sheathed heater to the wall via the above contact area is inevitably small. In addition, if the sheathed heater is placed in a vacuum atmosphere such as in a vacuum kettle, a small gap which inevitably exists between the sheathed heater and the wall makes it hard to transmit the heat generated by the sheathed heater to the wall efficiently. Therefore, sheathed heaters are disadvantageous because of their limited heat transmission efficiency.

Ceramic resistor heaters have recently been developed. Mr. Tamamizu disclosed in his article "Ceramic Resistor Heater," *Electronic Ceramics,* Vol. 6 (No. 40) 66–71 (1980), various sintered ceramics such as SiC, $MoSi_2$, $LaCrO_3$ and $ZrO_2$ which may be used as heat-generating bodies. These sintered ceramic heaters are used primarily for heating furnaces to temperatures of 1600° C.–2000° C. If these sintered ceramic heaters are used for heating plates and vessels, they have to be attached to the walls of plates and vessels. In this case, too, complete contact of these sintered ceramic heaters with the walls cannot be achieved.

Attempts have been made to form heat-generating ceramic films on substrates by spraying, particularly plasma spraying. Smyth et al. disclosed the production of NiO $Fe_3O_4$ ceramic resistors by arc plasma spraying in "Production of Resistors by Arc Plasma Spraying," Electrocomponent Science and Technology, Vol. 2, 135–145 (1975). The NiO $Fe_3O_4$ ceramic resistors, however, have resistivity which varies sharply as the ratio of NiO to $Fe_3O_4$ changes. Therefore, the production of NiO.$Fe_3O_4$ ceramic resistors having the desired resistivity requires strict control of the composition of a NiO.-$Fe_3O_4$ mixture.

Japanese Patent Laid-Open No. 59-130080 discloses the plasma spraying of $TiO_2$ powder to form a resistor on an insulator-coated plate. $TiO_2$ is reduced to $TiO_{2-x}$ during the plasma spraying in an atmosphere of argon and hydrogen. The $TiO_{2-x}$ film resistor, however, has resistivity which lowers drastically as the temperature is elevated near room temperature and is very low when the temperature is high. Accordingly, it is difficult to have the desired resistivity during the overall heating operation.

OBJECT OF THE INVENTION

An object of the present invention is, therefore, to provide a film resistor heater comprising a film resistor having resistivity which is desirable for various applications including home electric appliances such as hot plates and vacuum kettles and heat rolls for electrostatic copiers, and also does not change drastically with its composition variation.

SUMMARY OF THE INVENTION

A film resistor heater according to the present invention comprises a sprayed film resistor comprising NiCr particles uniformly dispersed in an insulating ceramic matrix.

More specifically, a film resistor heater according to the present invention comprises a bonding layer formed on a substrate to be heated; an insulating layer formed on the bonding layer; and a resistor layer formed on the insulating layer, which comprises NiCr particles uniformly dispersed in an insulating ceramic matrix.

DESCRIPTION OF THE PREFERRED EMBODIMENTS

Insulating ceramic materials which may be used together with NiCr to form a sprayed resistor film include $Al_2O_3$, MgO, $Al_2O_3$ MgO, $Y_2O_3$, $SiO_2$ and ZrO. $Al_2O_3$ and $Al_2O_3$.MgO are most preferable because they have sufficient resistance to humidity and are inexpensive. An insulating ceramic matrix may be formed by one or more of the above materials, for example, $Al_2O_3$ or $Al_2O_3$.MgO.

NiCr powder may comprise Cr in the proportion of 5–40 weight %, preferably 7–12 weight %.

NiCr included in the resistor film is 1–30 weight %, preferably 5–15 weight %. Both NiCr powder and insulating ceramic powder are 1–20 $\mu$m, preferably 1–10 $\mu$m in particle size. Both powders preferably have substantially the same particle size to make sure that they are mixed uniformly in the resulting resistor layer.

Insulating ceramic material powder and NiCr powder are uniformly mixed and sprayed. Although any spraying method such as flame spraying, detonation spraying and plasma spraying may be used for the purpose of the present invention, plasma spraying is most preferable because it can provide a high temperature ceramic film resistor heater strongly adhered to a substrate. Because of heat stress repeatedly applied to the film resistor heater during the heating-and-cooling cycles, the strong adhesion of the film resistor heater to the substrate is highly needed.

Figure 1:
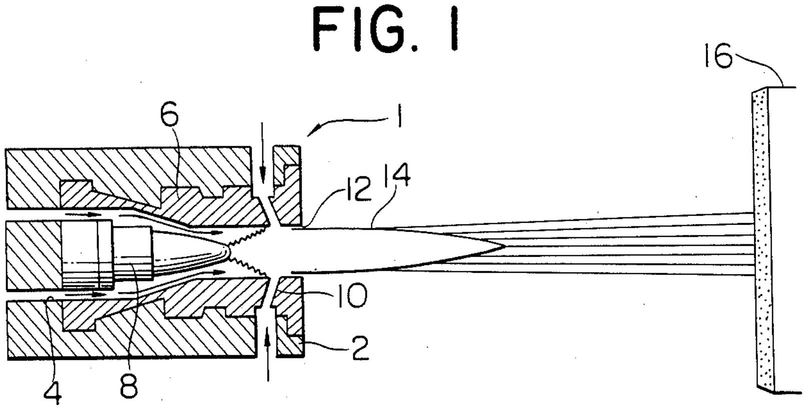
FIG. 1 is a schematic cross-sectional view of the plasma spraying using an arc plasma gun according to the present invention.

FIG. 1 schematically shows the plasma spraying according to the present invention. A plasma spray gun 1 comprises a gun body 2 having a central path 4 for flowing an operation gas. A part of the path 4 is enclosed by an anode 6, and a rod-type cathode 8 is mounted in the path 4. The operation gas flows through the gap between the central path 4 and the cathode 8. A path 10 for supplying powder mixtures to be sprayed is open to the central path 4 near a nozzle opening 12.

The operation gas should be able to provide a plasma by applying an arc. Also it must not corrode a plasma gun nozzle. The gas satisfying the above requirements is rare gas such as argon and helium, which may include hydrogen and/or nitrogen.

While the operation gas is flowing through the central path 4 of the gun 1, arc is provided between the anode 6 and the cathode 8. The voltage for forming the arc is generally 50–100V. The arc turns the operation gas into a high-temperature plasma jet 14 which is generally 5,000°–10,000° C. The velocity of the plasma jet may be 200–300 m/sec.

Powders to be sprayed are supplied through the side path 10 into the plasma formed in the central path 4. When the powder is carried by the plasma jet, it is completely melted.

A substrate 16 is placed at the distance of 5–50 cm from the plasma gun 1. The substrate which is to be heated by the film resistor may be made of steel, stainless steel, aluminum, glass, plastics, etc. Before being sprayed, the substrate may be surface-treated. The surface treatment comprises blasting with sands or grits. The blasted substrate can adhere to a sprayed film resistor heater very strongly. If necessary, the substrate surface may be treated with organic solvents to remove oil contamination.

Figure 2:
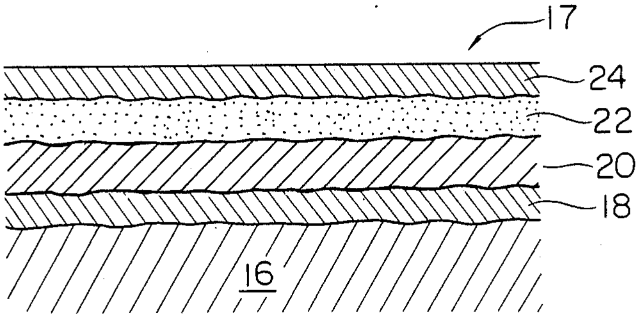
FIG. 2 is an enlarged cross-sectional view of the plasma-sprayed film resistor heater according to the present invention.

A typical film resistor heater 17 of the present invention has a layer structure as shown in FIG. 2.

A bonding layer 18 is formed by plasma spraying directly on the blasted substrate 16. The bonding layer may be made of any alloys which can strongly bond the substrate 16 and an overlying layer. The preferred bonding materials are Al-Mo-Ni alloys, Ni-Cr-Al alloys, etc. The bonding layer 18 is generally 10–100 μm thick.

An insulating layer 20 is then plasma-sprayed on the bonding layer. The insulating layer 20 may be made of any insulating ceramics such as $Al_2O_3$, $Al_2O_3$.MgO, $Y_2O_3$, $SiO_2$, $ZrO_2$ and mixtures thereof. The insulating layer is generally 50–500 μm thick.

The resistor layer 22 is then plasma-sprayed on the insulating layer 20. The resistor layer 22 comprises NiCr particles and an insulating ceramic matrix such as $Al_2O_3$ or $Al_2O_3$.MgO. Since NiCr particles are uniformly dispersed in the insulating ceramic matrix and partly contacted with each other, the resistivity of the resistor layer 22 decreases as the NiCr content increases. It is our invention's great advantage that the resistor layer 22 of the present invention has resistivity which decreases much more slowly as the NiCr content increases as compared with sprayed film resistors made of other ceramic materials. Thanks to this feature, the resistor layer 22 can have a resistance which does not substantially change depending on the inevitable compositional variations of the resistor layer. The thickness of the resistor layer 22 depends on how high resistance is required.

Since the film heater of the present invention may be placed in a humid environment, a protective layer 24 is desirable. It may be made of humidity-resistant resins such as Teflon. Its thickness is preferably 10–50 μm.

Figure 3:
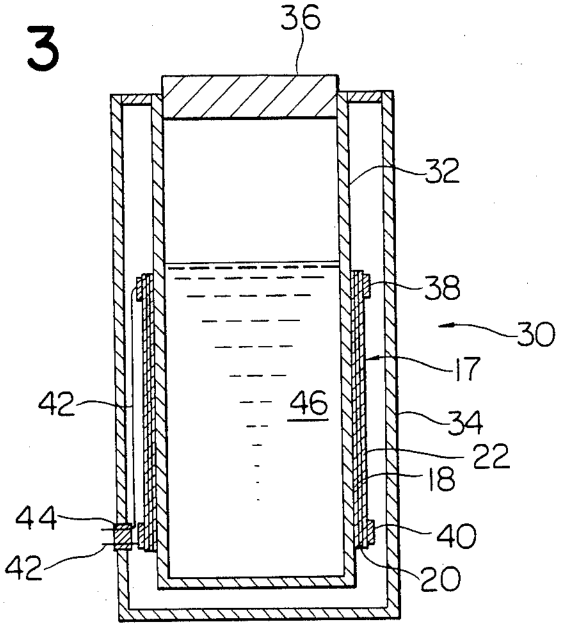
FIG. 3 is a cross-sectional view of a vacuum kettle comprising the plasma-sprayed film resistor heater.

FIG. 3 shows a vacuum kettle comprising the film resistor heater according to the present invention. The vacuum kettle 30 comprises an inner cylinder 32, an outer cylinder 34 and a lid 36. A space between the inner cylinder and the outer cylinder is kept vacuum (lower than $10^{-6}$ Torr). The outer wall of the inner cylinder 32 is provided with the film resister heater 17 having the bonding layer 18, the insulating layer 20 and the resistor layer 22. In this embodiment, the protective layer is not formed because the heater is placed in vacuum. Mounted at both ends of the resistor layer are electrodes 38 and 40. The electrodes may be formed by plasma spraying, welding soldering, conductive paste coating, etc. Lead wires are connected to the electrodes 38 and 40 and exit through the opening 44 which is then tightly sealed. The water 46 is retained in the inner cylinder 32.

Since the film resistor heater according to the present invention is completely adhered to a substrate which is to be heated, heat generated by the heater can be transmitted to the substrate extremely efficiently. This is advantageous particularly when the film heater is used in a vacuum atmosphere such as in a vacuum kettle. Also since the film resistor heater is strongly adhered to the substrate by plasma spraying, the film resistor heater never tends to peel off. What is more important is that the resistivity of the sprayed film resistor of the present invention does not change drastically with the inevitable variations of the NiCr content, so that the film resistor heater can have extremly reliable resistance. The film resistor heater of the present invention has many applications including various home electric appliances such as hot plates, rice cookers and vacuum kettles, and heat rolls installed in electrostatic copiers.

The present invention will be explained in further detail by the following Examples.

EXAMPLE

The film resistor heater as shown in FIG. 2 was prepared by plasma spraying on a 3-mm-thick stainless steel plate.

The plate was first shot-blasted with $Al_2O_3$ grits for 3 minutes to make the plate surface sufficiently rough.

Al-Mo-Ni alloy powder of 8 μm in average particle size was sprayed onto the blasted plate under the following spraying conditions:

Operation Gas: 100-part argon + 15-part hydrogen
Arc Current: 500A
Arc Voltage: 70V DC
Gun/Plate Distance: 15 cm
Powder Supply Rate: 25 Lbs./hr
Total Spraying Time: 2 min.

The resulting Al-Mo-Ni bonding layer was 50 μm thick. Sprayed on the bonding layer was $Al_2O_3$ MgO powder to form an insulating layer. The spraying conditions were as follows:

Operation Gas: 75-part argon + 15-part hydrogen
Arc Current: 500A
Arc Voltage 80V DC
Gun/Plate Distance: 10 cm
Powder Supply Rate: 6 Lbs./hr
Total Spraying Time: 10 min.

The resulting insulating layer was as thick as 300 μm.

Sprayed on the insulating layer was resistor materials which consisted of 8 weight % NiCr powder (average particle size: 5 μm) and 92 weight % $Al_2O_3$.MgO powder. The spraying conditions were as follows:

Operation Gas: 75-part argon + 15-part hydrogen
Arc Current: 500A
Arc Voltage: 80V DC
Gun/Plate Distance: 10 cm
Powder Supply Rate: 6 Lbs./hr
Total Spraying Time: 10 min.

The resulting resistor layer was as thick as 50 μm and 10 cm×25 cm in size.

A pair of electrodes made of copper bronze alloy were mounted onto the film resistor at both longitudinal ends thereof. After mounting a lead wire onto each of the electrodes, the resistor layer was coated with a 20-μm-thick protective dense layer of Teflon (trade name for polytetrafluoro ethylene).

AC power of 100V and 4 amperes was applied to the film resistor heater to heat the plate to 200° C. A temperature distribution on the plate surface was as good as 200°±5° C., and electric power required for keeping the plate at 200° C. was 400W. On the other hand, when the same stainless steel plate was provided with a conventional sheathed heater at intervals of 100 mm, the surface temperature distribution was 200°±30° C., and the electric power consumption was 530W.

It should be noted that though the present invention has been explained by means of Example, it is not limited thereto and any modifications and variations may be made within the scope of the spirit of the present invention.

What is claimed is:

1. A plasma sprayed film resistor heater comprising
a blasted metal substrate,
a bonding layer of an Al-Mo-Ni alloy or a Ni-Cr-Al alloy formed on said metal substrate, said bonding layer having a thickness of 10 to 100 μm,
an insulating layer of $Al_2O_3$ or $Al_3O_3$-$M_2O$ formed on said bonding layer, said insulating layer having a thickness of 50 to 500 μm, and
a resistor layer formed on said insulating layer, said resistor layer comprising NiCr particles uniformly dispersed in, and partially in contact with each other, in an insulating ceramic matrix of $Al_2O_3$ or $Al_2O_3$-$M_2O$.

2. The film resistor heater according to claim 1 further comprising a protective layer formed by plasma spraying on said resistor layer, said protective layer being made of a humidity-resistant resin.

* * * * *